US012168814B2

(12) United States Patent
Hagiwara

(10) Patent No.: US 12,168,814 B2
(45) Date of Patent: Dec. 17, 2024

(54) PROCESSING METHOD

(71) Applicant: SUBARU CORPORATION, Tokyo (JP)

(72) Inventor: Yukihiro Hagiwara, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 556 days.

(21) Appl. No.: 16/640,649

(22) PCT Filed: Nov. 9, 2017

(86) PCT No.: PCT/JP2017/040376
§ 371 (c)(1),
(2) Date: Feb. 20, 2020

(87) PCT Pub. No.: WO2019/092826
PCT Pub. Date: May 16, 2019

(65) Prior Publication Data
US 2020/0354811 A1 Nov. 12, 2020

(51) Int. Cl.
C22B 7/00 (2006.01)
C21B 3/04 (2006.01)
C21B 3/10 (2006.01)
C21C 5/52 (2006.01)
H01M 6/52 (2006.01)
H01M 10/54 (2006.01)

(52) U.S. Cl.
CPC ............ *C22B 7/00* (2013.01); *C21B 3/04* (2013.01); *C21B 3/10* (2013.01); *C21C 5/52* (2013.01); *C21C 5/5264* (2013.01); *C21C 5/527* (2013.01); *H01M 6/52* (2013.01); *H01M 10/54* (2013.01); *C21B 2400/02* (2018.08)

(58) Field of Classification Search
CPC ............ C22B 7/00; C22B 7/003; H01M 6/52; H01M 10/54; C21B 3/10; Y02P 10/20
See application file for complete search history.

(56) References Cited

U.S. PATENT DOCUMENTS 3,109,727 A * 11/1963 Miller ..................... C22B 1/14
65/19
5,019,455 A * 5/1991 Downie ................... B22D 3/00
428/584
5,855,645 A 1/1999 Myerson et al.
8,840,702 B2 9/2014 Verscheure et al.
(Continued)

FOREIGN PATENT DOCUMENTS

CN 105849290 A 8/2016
CN 105992829 A 10/2016
(Continued)

OTHER PUBLICATIONS

Molten aluminium vs. Li-po battery, Mar. 5, 2017, Molten Things (https://www.youtube.com/watch?v=usu51HZ2vy8) (Year: 2017).*
(Continued)

*Primary Examiner* — George Wyszomierski
*Assistant Examiner* — Nikolas Takuya Pullen
(74) *Attorney, Agent, or Firm* — Rimon P.C.

(57) ABSTRACT

The invention relates to a processing method of a battery pack that includes at least a battery body and a resin. The processing method includes a step of covering the battery pack with a slag that is at a predetermined temperature.

12 Claims, 8 Drawing Sheets

(56) References Cited

U.S. PATENT DOCUMENTS

| | | | |
|---|---|---|---|
| 2002/0100345 A1* | 8/2002 | Granati | H01M 10/54 75/401 |
| 2005/0235775 A1 | 10/2005 | Cheret et al. | |
| 2014/0069234 A1 | 3/2014 | Takahashi et al. | |
| 2014/0345422 A1 | 11/2014 | Takahashi et al. | |
| 2016/0315330 A1 | 10/2016 | Picard et al. | |
| 2017/0005374 A1 | 1/2017 | Brouwer et al. | |

FOREIGN PATENT DOCUMENTS

| | | | |
|---|---|---|---|
| EP | 0453904 A1 * | 10/1991 | H01M 6/52 |
| WO | 2012/032256 A1 | 3/2012 | |

OTHER PUBLICATIONS

Bobby, How is Lithium-Polymer Battery Made, UPS Battery Center, Sep. 8, 2014 (Year: 2014).*

What Is Lipo Battery Pack Construction, Gens Tattu, Apr. 18, 2017 (Year: 2017).*

Baosteel's Total Process Steel Slag Treatment Process Leads the Industrial Development, Baosteel, Jun. 4, 2010 (Year: 2010).*

Chinese Office Action issued in corresponding Chinese Patent Application No. 201780093306, dated Jul. 23, 2021, with English translation.

R. Guoxing et al., "Theoretical prediction and experimental verification of conditional windows for smelting reduction process of spent lithium-ion batteries", Journal of Materials and Metallurgy, vol. 15, No. 2, Jun. 14, 2016, pp. 147-151, with English Abstract.

W. Yuan et al., "Co—Cu—Fe alloy recycled from spent lithium ion batteries by reducing smelting process", Materials Science & Technology, vol. 18, No. 4, Aug. 2010.

J. Ylipekkala, "Quality Management of Chromium Containing Steel Slags from Melt Phase to Cooling", Master's Thesis, Master of Science Programme, Lulea University of Technology, Department of Chemical Engineering and Geosciences, Division of Process Metallurgy, 2004, pp. 1-104.

Baosteel News, "Baosteel's Total Process Steel Slag Treatment Process Leads the Industrial Development", Baosteel Group, Jun. 4, 2010.

Extended European Search Report issued in corresponding European Patent Application No. 17931692.2-1103, dated Apr. 9, 2021.

International Search Report issued in corresponding International Patent Application No. PCT/JP2017/040376, dated Jan. 16, 2018, with English translation.

* cited by examiner

[FIG. 1]
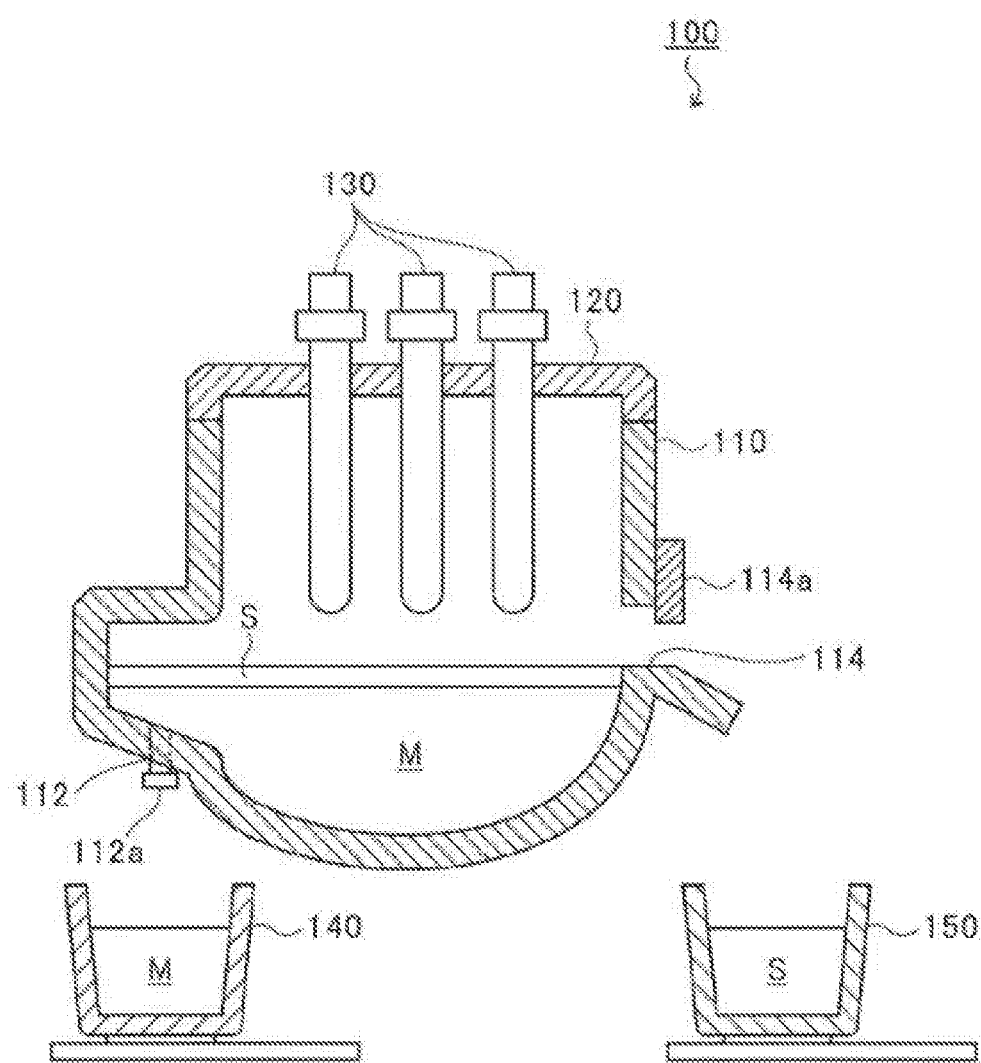

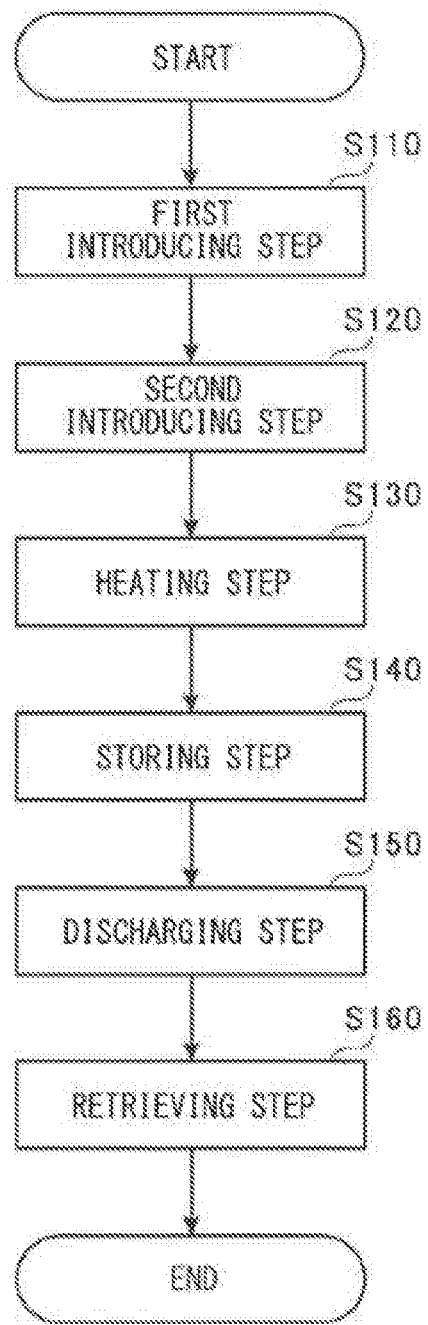

[ FIG. 5 ]
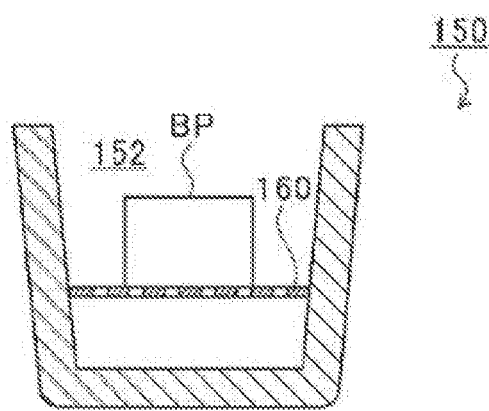

[FIG. 6]
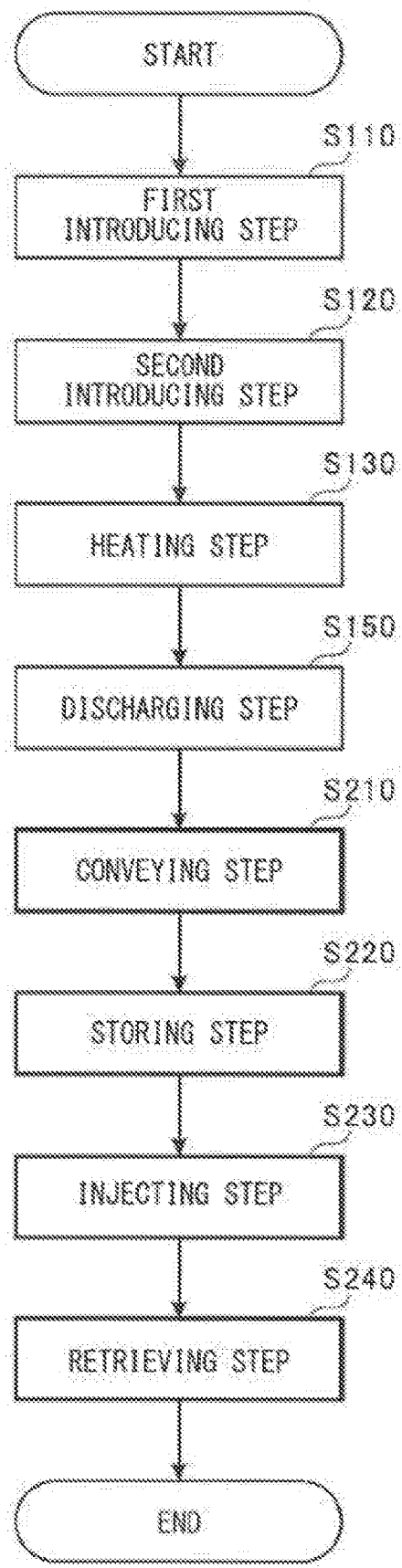

PROCESSING METHOD

CROSS REFERENCE

This application is the U.S. National Phase under 35 U.S.C. § 371 of International Application No. PCT/JP2017/040376, filed on Nov. 9, 2017, the entire contents of each are hereby incorporated by reference.

TECHNICAL FIELD

The disclosure relates to a processing method.

BACKGROUND ART

A battery pack contains a valuable metal. Accordingly, the valuable metal is collected from the used battery pack and is recycled (recycling). Upon recycling of the used battery pack, the battery pack is first disassembled into: a battery body (a battery unit); a resin constituting a lid, etc.; a metal member constituting a housing, etc.; an electronic component such as a relay or a substrate; and a wire harness (a wiring line). Thereafter, disassembled components (modules) are subjected to processes suitable the respective components.

For example, as a technique of processing the battery body, a technique is disclosed in which a hole is formed in advance on the battery body, and the perforated battery body and a flux ($SiO_2$, $CaO$) are melted to collect an alloy containing the valuable metal (for example, reference is made to Patent Literature 1).

CITATION LIST

Patent Literature

Patent Literature 1: Japanese Unexamined Patent Application Publication No. 2012-041569

SUMMARY OF INVENTION

Problem to be Solved by the Invention

A processing method of a battery pack described above, however, has an issue in that it takes time and man-hours to disassemble the battery pack into components. In addition, in a case where the battery pack includes a battery body that outputs high-voltage electric power, an operator is forced to perform a cumbersome operation of wearing a protective equipment, etc., in order to prevent electric shock at the time of disassembly.

In view of such a problem, it is an object of the disclosure to provide a processing method that makes it possible to process a battery pack easily.

Means for Solving the Problem

To solve the above-described problem, a processing method according to an aspect of the disclosure is a processing method of a battery pack that includes at least a battery body and a resin. The processing method includes a step of covering the battery pack with a slag that is at a predetermined temperature.

The processing method may further include a step of storing the battery pack in a container, and the battery pack stored in the container may be covered with the slag.

The container may be a slag pan that receives the slag discharged from an electric furnace.

The slag pan may have an inner bottom surface formed to have an arc.

The slag pan may have an inner bottom surface formed to have a step.

The slag pan may have: a plate having one or a plurality of holes; and an inner space in which the plate is provided.

The container may be a hole formed on ground.

The predetermined temperature may be equal to or higher than 700° C.

Effects of the Invention

According to the disclosure, it is possible to process a battery pack easily.

BRIEF DESCRIPTION OF DRAWINGS

FIG. 1 is a diagram that describes an electric furnace.

FIG. 2 is a flowchart that describes a flow of processes of a processing method of a battery pack according to a first embodiment.

FIG. 5 is a diagram that describes a slag pan according to the first embodiment.

FIG. 6 is a flowchart that describes a flow of processes of a processing method of the battery pack according to a second embodiment.

MODES FOR CARRYING OUT THE INVENTION

Figure 3A:
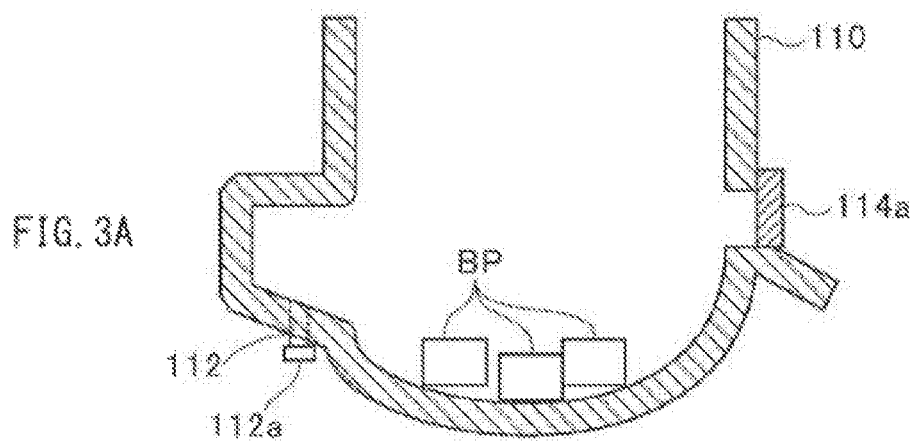
FIG. 3A is a first diagram that describes the flow of the processes of the processing method of the battery pack according to the first embodiment.

In the following, some embodiments of the disclosure are described in detail with reference to the accompanying drawings. Note that sizes, materials, specific values, and any other factors illustrated in respective embodiments are illustrative for easier understanding of the disclosure, and are not intended to limit the scope of the disclosure unless otherwise specifically stated. Throughout the present description and the drawings, elements having substantially the same function and configuration are denoted with the same reference numerals to avoid any redundant description. Further, elements that are not directly related to the disclosure are unillustrated in the drawings.

First Embodiment

In the present embodiment, a description is given of a processing method that processes a battery pack using a slag discharged from an electric furnace. In the following, a description is given first of the electric furnace, followed by a description of the processing method of the battery pack.

(Electric Furnace 100)

FIG. 1 is a diagram that described an electric furnace 100. Referring to FIG. 1, the electric furnace 100 includes a furnace body 110, a furnace cover 120, and electrodes 130.

A target to be melted (for example, an iron scrap) is introduced (charged) into the furnace body 110. The furnace body 110 includes the bottom having a tapping port 112. The tapping port 112 is sealed by a plug 112a. The furnace body 110 includes a side wall having a slag discharge port 114. The slag discharge port 114 is opened and closed by a door 114a.

The furnace cover 120 seals an opening formed at an upper part of the furnace body 110. The furnace cover 120 is detachably attached to the furnace body 110. There is provided the plurality of electrodes 130 (three in this case). The electrodes 130 penetrate through the furnace cover 120 and are disposed within the furnace body 110. The electrodes 130 are supplied with electric power from an unillustrated power source to apply an alternating-current voltage between the electrodes 130. Applying the voltage to the electrodes 130 generates an arc discharge, thereby heating (causing arc heating of) the target to be melted introduced into the furnace body 110 and melting the target to be melted.

A molten metal M and a slag S are generated as a result of the melting of the target to be melted in the furnace body 110. The molten metal M and the slag S are separated in the furnace body 110 by a difference in specific gravity. The molten metal M is positioned below the slag S in the furnace body 110.

The molten metal M is discharged from the tapping port 112. The discharged molten metal M is retained in a steel receiving pan 140. The molten metal M retained in the steel receiving pan 140 is transported to a processing facility at a subsequent stage, where the molten metal M is thereafter casted or rolled to be processed into a steel product (for example, a rod).

The slag S is discharged from the slag discharge port 114. The discharged slag S is retained in a slag pan 150. The slag S retained in the slag pan 150 is cooled, and is used as a roadbed material or granular aggregate.

(Processing Method)

Figure 3B:
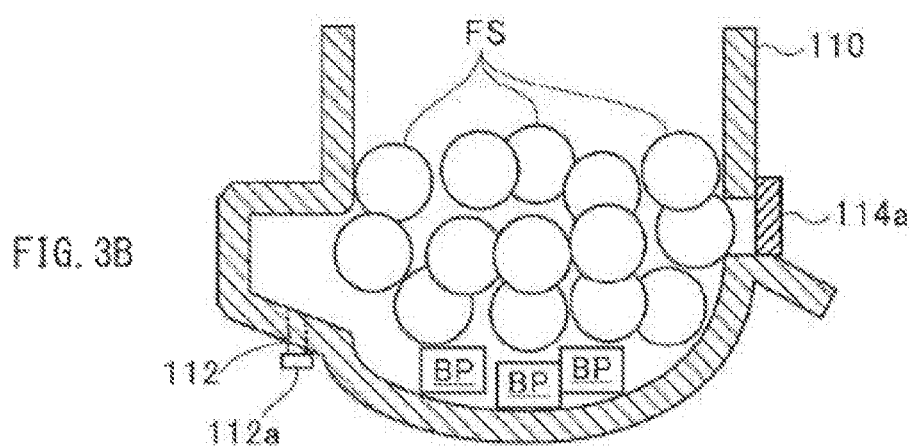
FIG. 3B is a second diagram that describes the flow of the processes of the processing method of the battery pack according to the first embodiment.
Figure 3C:
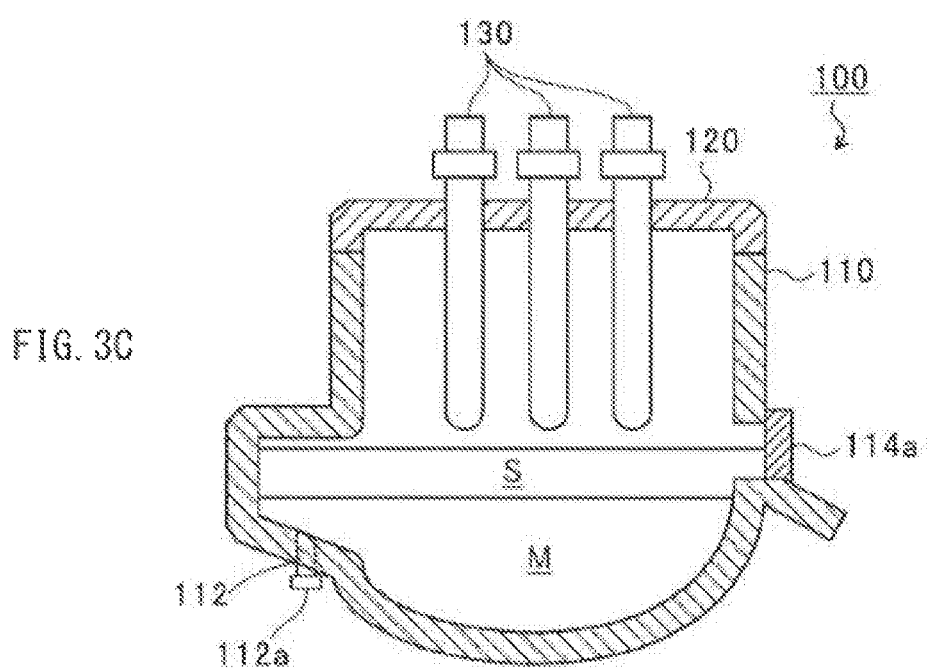
FIG. 3C is a third diagram that describes the flow of the processes of the processing method of the battery pack according to the first embodiment.
Figure 4A:
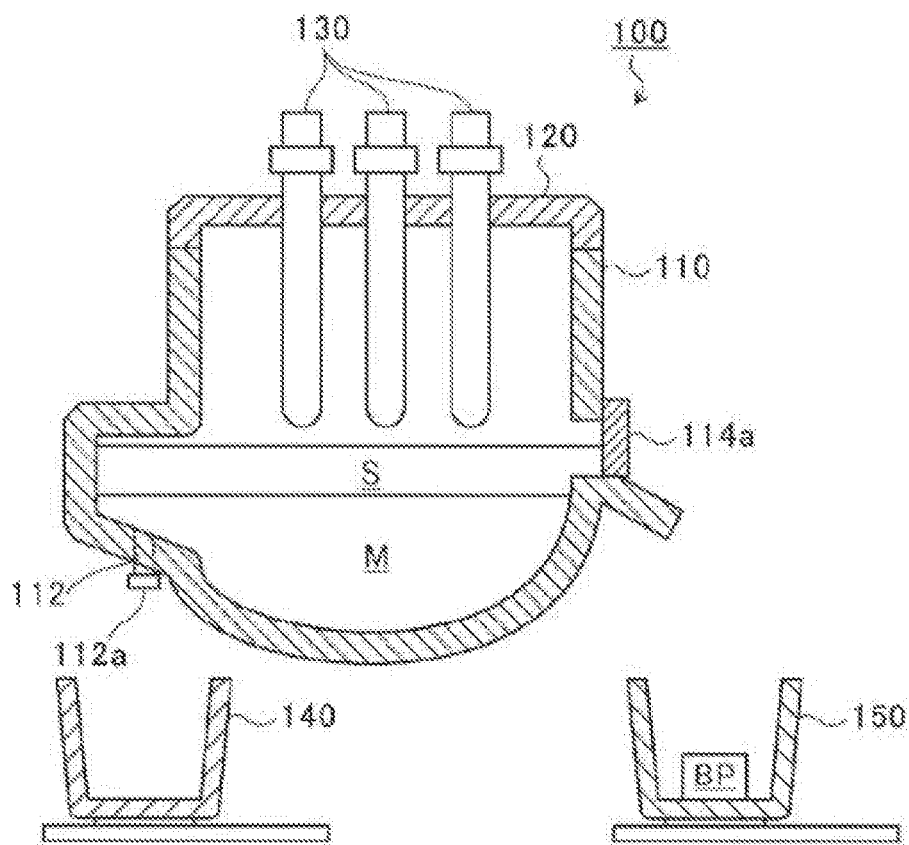
FIG. 4A is a fourth diagram that describes the flow of the processes of the processing method of the battery pack according to the first embodiment.
Figure 4B:
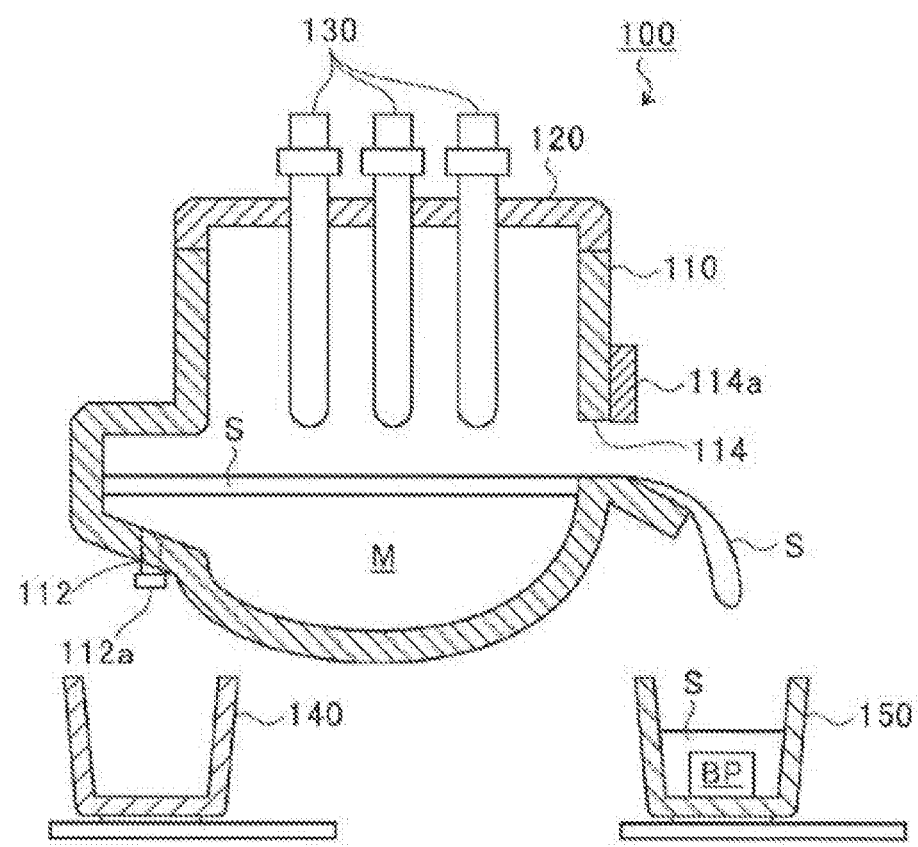
FIG. 4B is a fifth diagram that describes the flow of the processes of the processing method of the battery pack according to the first embodiment.

FIG. 2 is a flowchart that describes a flow of processes of a processing method of a battery pack BP according to the first embodiment. FIG. 3A is a first diagram that describes the flow of the processes of the processing method of the battery pack BP according to the first embodiment. FIG. 3B is a second diagram that describes the flow of the processes of the processing method of the battery pack according to the first embodiment. FIG. 3C is a third diagram that describes the flow of the processes of the processing method of the battery pack according to the first embodiment. FIG. 4A is a fourth diagram that describes the flow of the processes of the processing method of the battery pack according to the first embodiment. FIG. 4B is a fifth diagram that describes the flow of the processes of the processing method of the battery pack BP according to the first embodiment. The processing method according to the present embodiment includes a first introducing step S110, a second introducing step S120, a heating step S130, a storing step S140, a discharging step S150, and a retrieving step S160.

(First Introducing Step S110)

The first introducing step S110 is a step of introducing one or a plurality of battery packs BP directly (without being disassembled) into the furnace body 110 of the electric furnace 100. The battery pack BP includes not only a battery body (a battery unit), but also includes: a resin constituting a lid, etc.; a metal member constituting a housing, etc.; an electronic component such as a relay or a substrate; and a wire harness (a wiring line). For example, the mass of the battery packs BP is in a range from about 40 kg to about 400 kg.

In the first introducing step S110, first, the furnace cover 120 is removed, following which the battery packs BP are introduced into the furnace body 110 as illustrated in FIG. 3A.

(Second Introducing Step S120)

The second introducing step S120 is a step of introducing a material containing iron onto the battery packs BP. For example, the material containing iron is an iron scrap (scrap iron) FS. In the second introducing step S120, the iron scraps FS are introduced onto the battery packs BP in the furnace body 110 as illustrated in FIG. 3B.

(Heating Step S130)

The heating step S130 is a step of heating the battery packs BP and the iron scraps FS. In the heating step S130, the furnace body 110 is sealed by the furnace cover 120 as illustrated in FIG. 3C, and the electric power is supplied from the unillustrated power source to the electrodes 130 for a predetermined period of time (for example, about 30 minutes). Thus, the alternating-current voltage is applied between the electrodes 130 to cause the arc discharge, thereby heating and melting the iron scraps FS and the battery packs BP. A heating temperature in the furnace body 110 is 2000° C. or higher (for example, about 3000° C.). As a result, the molten metal M and the slag S are generated. Note that a metal contained in the iron scraps FS and a metal contained in the battery packs BP become the molten metal M.

In this manner, it is possible to retrieve a metal from the battery pack BP by an easy process of simply introducing the battery pack BP as it is into the electric furnace 100 that originally manufactures steel from the iron scrap FS. Hence, it is possible to eliminate the necessity to disassemble the battery pack BP, and to reduce the time and man-hours required to process the battery pack BP. In addition, the disassembly is not necessary, making it possible to avoid a situation in which an operator is forced to perform a cumbersome operation of wearing a protective equipment, etc., even in a case where the battery pack BP includes the battery body that outputs high-voltage electric power.

In addition, the resin included in the battery pack BP functions as a reducing agent in the furnace body 110. Hence, it is possible to reduce an amount of the reducing agent (for example, coke) to be supplied to the furnace body 110 as compared with a case where only the iron scrap FS is introduced into the furnace body 110. Further, in a case where the battery pack BP is introduced into the furnace body 110, it is possible to reduce an amount of $CO_2$ to be discharged upon reduction reactions as compared with a case where only the coke is supplied. It is also possible to eliminate the necessity of causing the resin to be disposed of in a final disposal site (to be buried) as compared with an existing technique in which the battery pack BP is disassembled to process each component, making it possible to reduce costs required for disposing of the resin.

Further, in a case where steel is to be manufactured only from the iron scrap FS, a non-ferrous metal other than iron (for example, copper, nickel, cobalt, aluminum, or the like) is separately supplied to the electric furnace 100, depending on required performance (a material) of the steel to be manufactured. In contrast, according to the processing method of the present embodiment, the battery pack BP is introduced into the furnace body 110 in addition to the iron scrap FS. Hence, it is possible to reduce, by an amount corresponding to the amount of non-ferrous metal contained in the battery pack BP, an amount of the non-ferrous metal to be separately supplied. Further, it is not necessary to refine aluminum as compared with an existing technique in which the battery pack BP is disassembled, making it possible to reduce electric power required for refining the aluminum and to reduce emissions of $CO_2$ generated upon the refining.

In addition, performing the first introducing step S110 and the second introducing step S120 allows the iron scraps FS to be placed on the battery packs BP in the furnace body 110 as described above. This makes it possible to cause the iron scraps FS to function as a weight, which in turn makes it possible to avoid a situation in which the battery packs BP float in the heating step S130. Further, the iron scraps FS make it possible to prevent phreatic explosion of the battery packs BP.

(Storing Step S140)

The storing step S140 is a step of storing one or a plurality of battery packs BP in the slag pan 150 (a container) as illustrated in FIG. 4A.

FIG. 5 is a diagram that describes the slag pan 150 according to the first embodiment. Referring to FIG. 5, the slag pan 150 has an inner space 152 in which a plate 160 is provided. The plate 160 divides the inner space 152 of the slag pan 150 vertically into an upper part and a lower part. The plate 160 has one or a plurality of holes. The hole has a size that makes it difficult or impossible for the battery pack BP to pass therethrough. A shape of the hole is not limited. For example, the hole has the shape of a slit, a rectangle, or a circle. The plate 160 is, for example, a mesh (a net) made of steel. In the storing step S140, one or the plurality of battery packs BP is stored (placed) on the plate 160. Accordingly, a space is formed below the plate 160 in the inner space 152 of the slag pan 150.

(Discharging Step S150)

The discharging step S150 is a step of discharging the slag S and the molten metal M from the furnace body 110. In the discharge step S150, first, the door 114a is moved to open the slag discharge port 114. This discharges the slag S from the furnace body 110 through the slag discharge port 114. The discharged slag S is supplied to the slag pan 150. As described above, the battery pack BP is stored in the slag pan 150 in the storing step S140, causing the battery pack BP to be covered with the slag S in the slag pan 150. The slag S discharged from the slag discharge port 114 is 1000° C. or higher (for example, 1200° C. or higher and lower than 1400° C.). Thus, covering the battery pack BP with the slag S allows the resin included in the battery pack BP to be sublimated (vaporized). Accordingly, it is possible to remove the resin from the battery pack BP, and to allow only a metal (a metal piece) to remain. The term "covering" as used herein encompasses the meaning of applying the slag S to the battery pack BP, covering the battery pack BP with the slag S as a whole, and transferring a heat of the slag S to the battery pack BP.

In addition, the slag S is supplied to the battery pack BP stored in the slag pan 150, allowing the battery pack BP to be covered with the slag S while causing the battery pack BP to be hardly in contact with oxygen (air). Hence, it is possible to avoid a situation in which the resin is oxidized, and to suppress the generation of soot.

Further, the battery pack BP is stored on the plate 160 provided in the slag pan 150 in the storing step S140 as described above. Thus, the slag S is also supplied to the space below the battery pack BP when the slag S is supplied to the slag pan 150 in the discharging step S150. Hence, it is possible to ensure that the battery pack BP is covered with the slag S as a whole. In addition, the heat is transferred from the lower side to the upper side of the battery pack BP by convection. Hence, it is possible to ensure melting of the battery pack BP.

Thereafter, the tapping port 112 is opened in the discharging step S150. This allows the molten metal M to be discharged from the furnace body 110 through the tapping port 112. The discharged molten metal M is supplied to the steel receiving pan 140. Thus, the metal retrieved from the battery pack BP becomes the molten metal M together with the metal contained in the iron scrap FS. The molten metal M is processed and reused.

(Retrieving Step S160)

The retrieving step S160 is a step of retrieving the metals from the slag pan 150. The metals (the metal pieces) are buried in the slag S, as a result of the resin being removed from the battery pack BP by the application of the slag S in the discharging step S150. Accordingly, the retrieving step S160 involves standing by until the slag pan 150 (the slag S and the metals) is cooled to a predetermined temperature. When the predetermined temperature is reached, the slag S is first retrieved from the slag pan 150 and the metals are then retrieved from the slag pan 150. The slag S thus retrieved is used as the roadbed material or the granular aggregate. The metals are pulverized by a shredder and are then separated depending on types of metals (for example, iron, copper, nickel, cobalt, aluminum, etc.).

According to the processing method of the present embodiment, it is possible to retrieve a metal from the battery pack BP by an easy process of simply covering the battery pack BP with the high-temperature slag S that is equal to or higher than the predetermined temperature as described above. Hence, it is possible to eliminate the necessity to disassemble the battery pack BP, and to reduce the time and man-hours required to process the battery pack BP. In addition, the disassembly is not necessary, making it possible to avoid a situation in which an operator is forced to perform a cumbersome operation of wearing a protective equipment, etc., even in a case where the battery pack BP includes the battery body that outputs high-voltage electric power.

In addition, the slag S is supplied to the slag pan 150, making it possible to avoid a situation in which the slag S is absorbed into any other part. Hence, it is possible to ensure that the battery pack BP is processed within the slag pan 150.

Further, it is possible to cause the metal to be retained within the slag pan 150. In other words, it is possible to avoid a situation in which the metal flows out to the outside. Hence, it is possible to collect the metal completely from the battery pack BP.

Second Embodiment

The description has been given of the storing step S140 according to the first embodiment described above by referring to a case in which the battery pack BP is stored in the slag pan 150. In other words, a case has been described in which the battery pack BP is covered with the slag S at an indoor location in the discharging step S150. However, the battery pack BP may be covered with the slag S at an outdoor location.

Figure 7A:
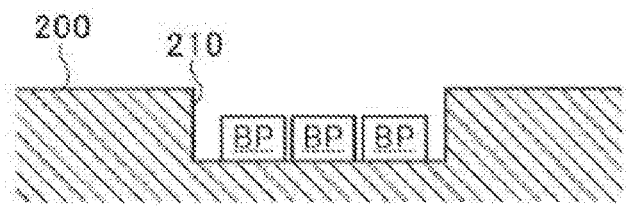
FIG. 7A is a first diagram that describes the flow of the processes of the processing method of the battery pack according to the second embodiment.
Figure 7B:
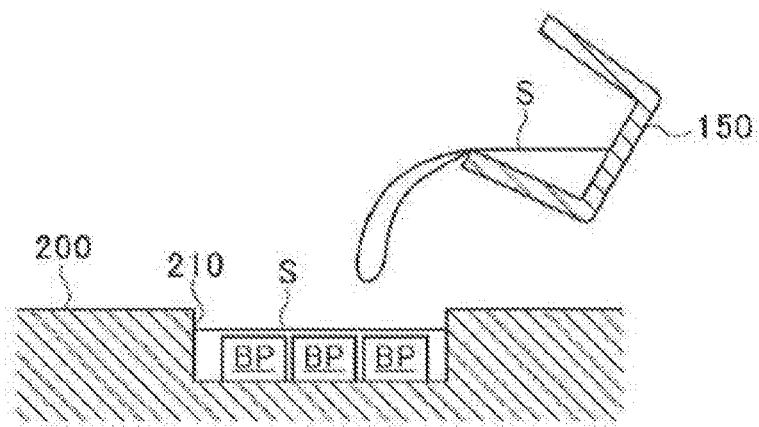
FIG. 7B is a second diagram that describes the flow of the processes of the processing method of the battery pack according to the second embodiment.

FIG. 6 is a flowchart that describes a flow of processes of a processing method of the battery pack BP according to a second embodiment. FIG. 7A is a first diagram that describes the flow of the processes of the processing method of the battery pack BP according to the second embodiment. FIG. 7B is a second diagram that describes the flow of the processes of the processing method of the battery pack according to the second embodiment. The processing method according to the present embodiment includes the first introducing step S110, the second introducing step S120, the heating step S130, the discharging step S150, a conveying step S210, a storing step S220, an injecting step S230, and a retrieving step S240. Note that processes and configurations substantially the same as those of the first embodiment described above are denoted with the same reference numerals, and descriptions thereof are omitted.

(Conveying Step S210)

The conveying step S210 is a step of conveying the slag S stored in the slag pan 150 to a slag pit.

(Storing Step S220)

The storing step S220 is a step of storing one or the plurality of battery packs BP in a hole 210 (a container) formed in the slag pit 200 (ground) as illustrated in FIG. 7A.

(Injecting Step S230)

The injecting step S230 is a step of injecting the slag S from the slag pan 150 into the hole 210 as illustrated in FIG. 7B. As described above, the battery packs BP are stored in the hole 210 in the storing step S220, causing the battery packs BP to be applied with the slag S in the hole 210. The slag S injected from the slag pan 150 is 1000° C. or higher (for example, 1200° C. or higher and lower than 1400° C.). Thus, covering the battery packs BP with the slag S allows the resin included in the battery packs BP to be sublimated (vaporized). Accordingly, it is possible to remove the resin from the battery packs BP, and to allow only a metal (a metal piece) to remain.

In addition, the slag S is supplied to the battery packs BP stored in the hole 210, allowing the battery packs BP to be covered with the slag S while causing the battery packs BP to be hardly in contact with oxygen (air). Hence, it is possible to avoid a situation in which the resin is oxidized, and to suppress the generation of soot.

(Retrieving Step S240)

The retrieving step S240 is a step of retrieving the metals from the hole 210. The metals (the metal pieces) are buried in the slag S, as a result of the resin being removed from the battery packs BP by the application of the slag S in the injecting step S230. Accordingly, the retrieving step S240 involves standing by until the slag S and the metals stored in the hole 210 are cooled to a predetermined temperature. When the predetermined temperature is reached, the slag S is first dug out from the hole 210 and the metals are then retrieved from the hole 210. The slag S thus dug out is used as the roadbed material or the granular aggregate. The metals are pulverized by a shredder and are then separated depending on types of metals (for example, iron, copper, nickel, cobalt, aluminum, etc.).

According to the processing method of the present embodiment, it is possible to retrieve a metal from the battery pack BP by an easy process of simply covering the battery pack BP with the high-temperature slag S that is at the predetermined temperature as described above.

Although embodiments have been described in the foregoing with reference to the accompanying drawings, the disclosure is by no means limited to such embodiments. It should be appreciated that various modifications and alterations may be made by persons skilled in the art without departing from the scope as defined by the appended claims. The disclosure is intended to include such modifications and alterations in so far as they fall within the scope of the appended claims.

For example, the foregoing embodiments have been described by referring to an example of a configuration in which the battery pack BP is introduced into the electric furnace 100. However, it is not necessary for the battery pack BP to be introduced into the electric furnace 100. It is at least sufficient that the battery pack BP is covered with the slag S of 200° C. or higher.

In addition, the foregoing embodiments have been described by referring to an example of a case in which the battery pack BP is covered with the slag S of 1000° C. or higher. However, the battery pack BP may be covered with the slag S of 200° C. or higher. It is possible to sublime the resin if the slag S is 200° C. or higher. Further, the battery pack BP may be covered with the slag S of 700° C. or higher. It is possible to melt the aluminum if the slag S is 700° C. or higher.

In addition, the foregoing embodiments have been described by referring to an example in which the electric furnace 100 serves as a source of the slag S. However, the source of the slag S is not limited. For example, the battery pack BP may be covered with the slag S discharged from a blast furnace.

In addition, the foregoing first embodiment has been described by referring to an example of a configuration in which the slag pan 150 is provided with the plate 160. This allows an existing slag pan to be utilized without involving any modification. However, it is not necessary for the slag pan to be provided with the plate 160. In other words, the battery pack BP may be directly stored in the existing slag pan.

In addition, the slag pan may have a shape in which a space is formed below the battery pack BP when the battery pack BP is stored, without providing the plate 160. In other words, the slag pan can have a shape in which the battery pack BP and a bottom surface of the inner space are separated from each other when the battery pack BP is stored.

Figure 8A:
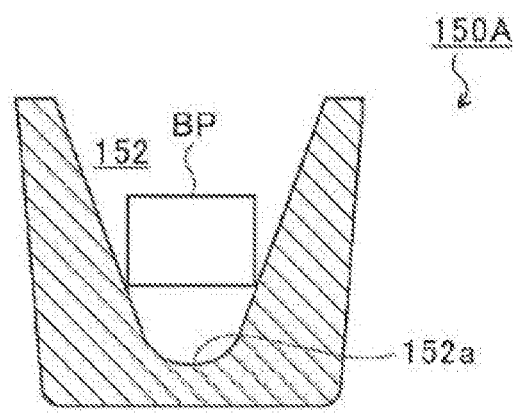
FIG. 8A is a diagram that describes a slag pan according to a first modification example.
Figure 8B:
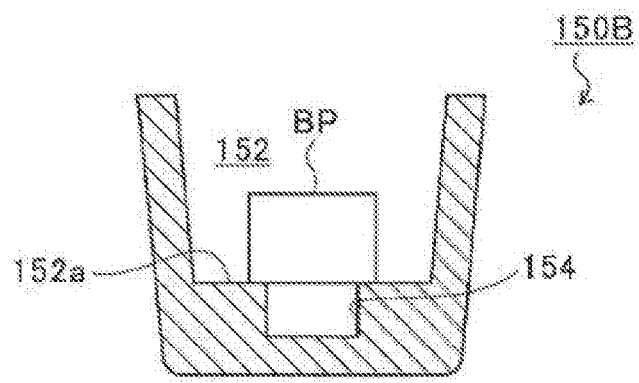
FIG. 8B is a diagram that describes a slag pan according to a second modification example.

FIG. 8A is a diagram that describes a slag pan 150A according to a first modification example. FIG. 8B is a diagram that describes a slag pan 150B according to a second modification example. Referring to FIG. 8A, the slag pan 150A has a tapered shape in which horizontal cross-sectional area of the inner space 152 gradually decreases from the upper side to the lower side. A bottom surface 152a (an inner bottom surface) of the inner space 152 of the slag pan 150A has an arc shape that is recessed downward. In a case where the battery pack BP is stored within the slag pan 150A, a lower end of the battery pack BP comes into contact with an inner peripheral surface of the slag pan 150, thereby forming a space below the battery pack BP. Note that it is not necessary for the bottom surface 152a of the inner space 152 of the slag pan 150A to have the arc shape. For example, the bottom surface 152a of the inner space 152 of the slag pan 150A may have a conical shape or a polygonal pyramid shape.

Further, referring to FIG. 8B, the slag pan 150B has a step 154 formed on the bottom surface 152a of the inner space 152. In other words, the step 154 is a hole that is formed on the bottom surface 152a of the inner space 152 of the slag pan 150B and that is recessed downward. The step 154 (the hole) has a size that prevents the battery pack BP from falling. In a case where the battery pack BP is stored within the slag pan 150B, a bottom surface of the battery pack BP comes into contact with the bottom surface 152a of the slag pan 150B, thereby forming a space below the battery pack BP.

In addition, the foregoing second embodiment has been described by referring to an example of a configuration in which the storing step S220 is performed. The storing step S220, however, is not an essential process. For example, the battery pack BP may be placed directly into the slag pit 200 (onto the ground) and may be covered with the slag S from above the battery pack BP.

In addition, the foregoing embodiments have been described by referring to an example in which the battery pack BP includes: the battery body (the battery unit), the resin constituting the lid, etc.; the metal member constituting the housing, etc.; the electronic component such as the relay or the substrate; and the wire harness (the wiring line). However, it is sufficient for the battery pack to include at least the battery body and the resin.

DESCRIPTION OF REFERENCE NUMERALS

BP Battery pack
S Slag
S140 Storing step
S150 Discharging step
S220 Storing step
S230 Injecting step
100 Electric furnace
150 Slag pan (container)
200 Slag pit (ground)
210 Hole (container)

The invention claimed is:

1. A processing method for a first battery pack and a second battery pack each including at least a battery body and a resin, the processing method comprising:
melting the first battery pack in an electric furnace to generate a molten metal and a slag;
separating the slag from the molten metal;
placing the second battery pack in a slag pan; and
discharging, from the electric furnace, the slag that is at a predetermined temperature and is generated using the first battery pack onto the second battery pack in the slag pan.

2. The processing method according to claim 1, wherein the slag pan has an inner bottom surface formed to have an arc to create a space between the inner bottom surface and a bottom of the second battery pack when the second battery pack is placed in the slag pan.

3. The processing method according to claim 2, wherein the predetermined temperature is equal to or higher than 700° C.

4. The processing method according to claim 1, wherein the slag pan has an inner bottom surface formed to have a step to create a space between the inner bottom surface and a bottom of the second battery pack when the second battery pack is placed on the step in the slag pan.

5. The processing method according to claim 4, wherein the predetermined temperature is equal to or higher than 700° C.

6. The processing method according to claim 1, wherein the slag pan has: a plate having one or more holes; and an inner space in which the plate is provided, wherein the second battery pack is placed on the plate in the slag pan, and
wherein, when the slag is discharged onto the second battery pack placed on the plate, the discharged slag passes through the one or more holes of the plate.

7. The processing method according to claim 6, wherein the predetermined temperature is equal to or higher than 700° C.

8. The processing method according to claim 1, wherein the predetermined temperature is equal to or higher than 700° C.

9. The processing method according to claim 1, wherein discharging the slag onto the second battery pack includes immersing the second battery pack in the slag such that a slag surface of the slag is closer to a rim of the slag pan than the second battery pack.

10. A processing method for a first battery pack and a second battery pack each including at least a battery body and a resin, the processing method comprising:
melting the first battery pack in an electric furnace to generate a molten metal and a slag;
separating the slag from the molten metal;
placing the second battery pack in a hole in ground; and
discharging, from the electric furnace, the slag that is at a predetermined temperature and is generated using the first battery pack onto the second battery pack in the hole.

11. The processing method according to claim 10, wherein the predetermined temperature is equal to or higher than 700° C.

12. The processing method according to claim 10, wherein discharging the slag onto the second battery pack includes immersing the second battery pack in the hole such that a slag surface of the slag is closer to a rim of the hole than the second battery pack.

* * * * *